(12) United States Patent
Kawano

(10) Patent No.: US 9,953,225 B2
(45) Date of Patent: Apr. 24, 2018

(54) IMAGE PROCESSING APPARATUS AND IMAGE PROCESSING METHOD

(75) Inventor: Atsushi Kawano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/287,382

(22) Filed: Nov. 2, 2011

(65) Prior Publication Data

US 2012/0114176 A1 May 10, 2012

(30) Foreign Application Priority Data

Nov. 5, 2010 (JP) .................................. 2010-248977

(51) Int. Cl.
*G06K 9/00* (2006.01)
*G06K 9/32* (2006.01)

(52) U.S. Cl.
CPC ..... *G06K 9/00771* (2013.01); *G06K 9/00362* (2013.01); *G06K 2009/3291* (2013.01); *G06T 2207/30196* (2013.01)

(58) Field of Classification Search
None
See application file for complete search history.

(56) References Cited

U.S. PATENT DOCUMENTS

| 2003/0107649 | A1* | 6/2003 | Flickner | G06K 9/00362 348/150 |
| 2005/0104727 | A1* | 5/2005 | Han | G06K 9/00335 340/541 |
| 2005/0104960 | A1* | 5/2005 | Han | G06K 9/00335 348/143 |
| 2008/0170751 | A1* | 7/2008 | Lei | G06T 7/2006 382/103 |
| 2009/0059007 | A1 | 3/2009 | Wagg | |

(Continued)

FOREIGN PATENT DOCUMENTS

| CN | 1875379 A | 12/2006 |
| CN | 101465033 A | 6/2009 |

(Continued)

OTHER PUBLICATIONS

Dedeoglu, Yigithan. Moving object detection, tracking and classification for smart video surveillance. Diss. bilkent university, 2004, 100 pages.*

(Continued)

*Primary Examiner* — Manav Seth
*Assistant Examiner* — Ryan P Potts
(74) *Attorney, Agent, or Firm* — Canon U.S.A., Inc. IP Division

(57) ABSTRACT

An image processing apparatus includes an object detection unit configured to detect an object from an image, a tracking unit configured to track the detected object, a trajectory management unit configured to manage a trajectory of the object being tracked, and a specific object detection unit configured to detect a specific object from the image. In a case where the specific object determination unit detects the object being tracked by the object tracking unit to be the specific object, the trajectory management unit manages a trajectory of the object being tracked at a time point before the time point the object being tracked is detected to be the specific object as the trajectory of the specific object.

22 Claims, 7 Drawing Sheets

(56) References Cited

U.S. PATENT DOCUMENTS

2009/0087024 A1* 4/2009 Eaton .............. G06K 9/00335
382/103
2010/0245567 A1 9/2010 Krahnstoever

FOREIGN PATENT DOCUMENTS

| JP | 2000-105835 A | 4/2000 |
|---|---|---|
| JP | 2002-342762 A | 11/2002 |
| JP | 2002-373332 A | 12/2002 |
| JP | 2009-152733 A | 7/2009 |
| JP | 2010-050934 A | 3/2010 |

OTHER PUBLICATIONS

Masoud, Osama, and Nikolaos P. Papanikolopoulos. "A novel method for tracking and counting pedestrians in real-time using a single camera." Vehicular Technology, IEEE Transactions on 50.5 (2001): 1267-1278. 12 pages.*

Yang, Yi, et al. "Layered object detection for multi-class segmentation." Computer vision and pattern recognition (CVPR), 2010 IEEE conference on. IEEE, 2010. 11 pages.*

Alan J. Lipton et al.; Moving Target Classification and Tracking From Real-Time Video; The Robotics Institute, Carnegie Mellon University, Oct. 19, 1998, pp. 8-14; XP010315540.

Robert T. Collins et al.; Algorithms for Cooperative Multisensor Surveillance; Proceedings of the IEEE, vol. 89, No. 10, Oct. 1, 2001; pp. 1456-1477; XP011044562.

Frederic Cupillard et al.; Tracking Groups of People for Video Surveillance; INRIA Sophia Antipolis, ORION Group, Jan. 1, 2002; Chapter 7, pp. 89-100; XP002503225.

Sayaka Okamoto, et al.; An Object Tracking System Using PC Controlled Cameras; IEICE Technical Report, vol. 109, No. 292, pp. 67-72; Nov. 12, 2009.

Osama Masoud, et al.; A Novel Method for Tracking and Counting Pedestrians in Real-Time Using a Single Camera; IEEE Transactions on Vehicular Technology, vol. 50, No. 5, Sep. 2001, pp. 1267-1278.

* cited by examiner

FIG. 5

| Parameter 1 | |
|---|---|
| Coordinates | (10,10), (20,30) |
| Region Type | Line |
| Size | 100-250 |
| Attribute | Human |
| Attribute count | 1 |
| Life time | 1_* |
| Event | cross |

IMAGE PROCESSING APPARATUS AND IMAGE PROCESSING METHOD

BACKGROUND OF THE INVENTION

Field of the Invention

The present invention relates to an image processing apparatus and an image processing method for tracking an object detected from an image.

Description of the Related Art

Conventionally, techniques for tracking an object or a human body detected from an image captured by a camera have been provided. For example, a technique for detecting an object from motion vectors, estimating a search point in the next frame, and performing object tracking by template matching is discussed in, for example, Japanese Patent Application Laid-Open No. 2002-373332. Also, a technique for performing detection of a face, and performing face tracking using movement information detected from a correlation between a current frame and a past frame is discussed in, for example, Japanese Patent Application Laid-Open No. 2010-50934.

However, in the image captured by the camera, the face and the human body of the object are not always captured in a direction features of the face and the human body are easily detected. Due to the problem, it is difficult to keep detecting the face and the human body. With the problem, if the face detection or the human body detection is performed, an appropriate tracking result may not be obtained. Moreover, in the processing of detecting and tracking an object, the target of the tracking processing is not specified to a specific object. Accordingly, the tracking technique is not suitable for analyzing the movement of the specific object.

SUMMARY OF THE INVENTION

The present invention is directed to accurately tracking a specific object in an image, such as the face, in which detection of features as the specific object is difficult.

According to an aspect of the present invention, an image processing apparatus includes an object detection unit configured to detect an object from an image, a tracking unit configured to track the detected object, a trajectory management unit configured to manage a trajectory of the object being tracked, and a specific object detection unit configured to detect a specific object from the image. In a case where the specific object determination unit detects the object being tracked by the object tracking unit to be the specific object, the trajectory management unit manages a trajectory of the object being tracked at a time point before the time point the object being tracked is detected to be the specific object as the trajectory of the specific object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of determination parameters.

DESCRIPTION OF THE EMBODIMENTS

Figure 1:
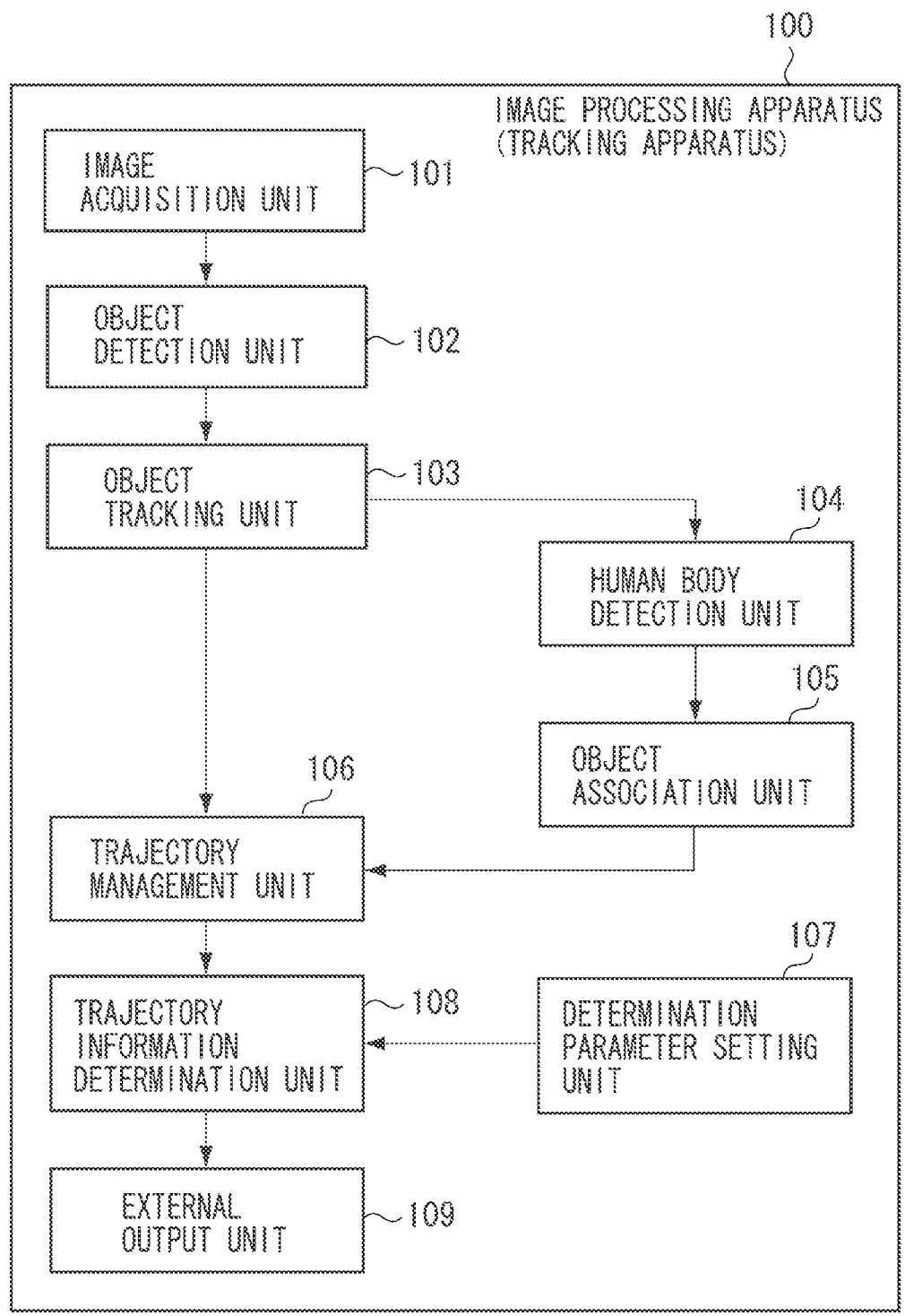
FIG. 1 is a block diagram illustrating an image processing apparatus.

Various exemplary embodiments, features, and aspects of the invention will be described in detail below with reference to the drawings.

Configurations described in the following exemplary embodiments are only examples, and the present invention is not limited to the configurations illustrated in the drawings.

A first exemplary embodiment is described. FIG. 1 illustrates a system configuration of an image processing apparatus 100 that serves as a tracking apparatus. The image processing apparatus 100 that serves as the tracking apparatus includes an image acquisition unit 101, an object detection unit 102, an object tracking unit 103, a human body detection unit 104, an object association unit 105, and a trajectory management unit 106. The image processing apparatus 100 that serves as the tracking apparatus further includes a determination parameter setting unit 107, a trajectory information determination unit 108, and an external output unit 109.

The image acquisition unit 101 time-sequentially acquires images to be processed from an external device. The external device is, for example, a camera or a server. Alternatively, an image stored in an external memory, or the like can be acquired.

The object detection unit 102 detects an object from the images acquired by the image acquisition unit 101 using a background subtraction technique. The object detected in the processing is, for example, a moving object. The object can be a foreground detected by the background subtraction technique, or a part that is determined not to be a background. The information of the detected object includes the position on the image, a bounding box, and the size of the object. In the object detection unit 102, the processing for detecting the object from the image is performed, and the processing method is not limited to the background subtraction technique.

The object tracking unit 103 associates the object detected by the object detection unit 102 with an object detected in a previous image, and tracks the detected object. To a newly appeared object, a new object identification (ID) (object identifier) is given. To the object that is associated with the previous image, an object ID that has been given in the previous image is given.

The human body detection unit 104 detects a human body from the region where the object detection unit 102 has detected the object using pattern matching processing. The processing in the human body detection unit 104 is for detecting a human body from an image, and the processing is not limited to the pattern matching processing. Moreover, it is not always necessary to detect a human body from the region detected by the object detection unit 102. The human body detection processing can be performed to the whole image. The detection target is not limited to the human body, but a specific object (an object that has a specific character or an object that is determined to have a specific pattern) can be detected. For example, the detection can be performed to determine that the object is an automobile or an animal.

The object association unit 105 establishes an association between the object detected by the object detection unit 102 and the human body detected by the human body detection unit 104.

Figure 2A:
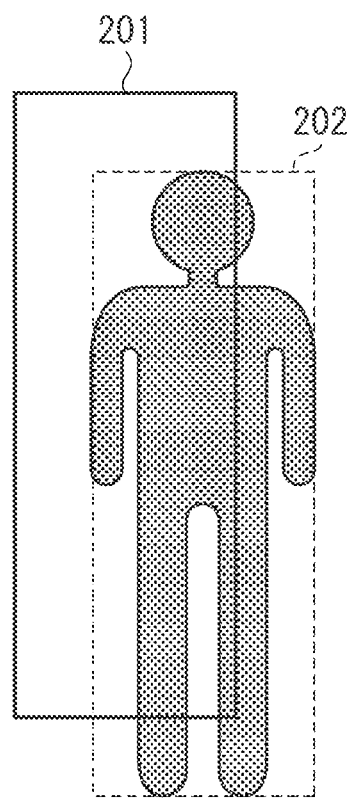
FIG. 2A illustrates an example of association between a detected object and a detected human body.
Figure 2B:
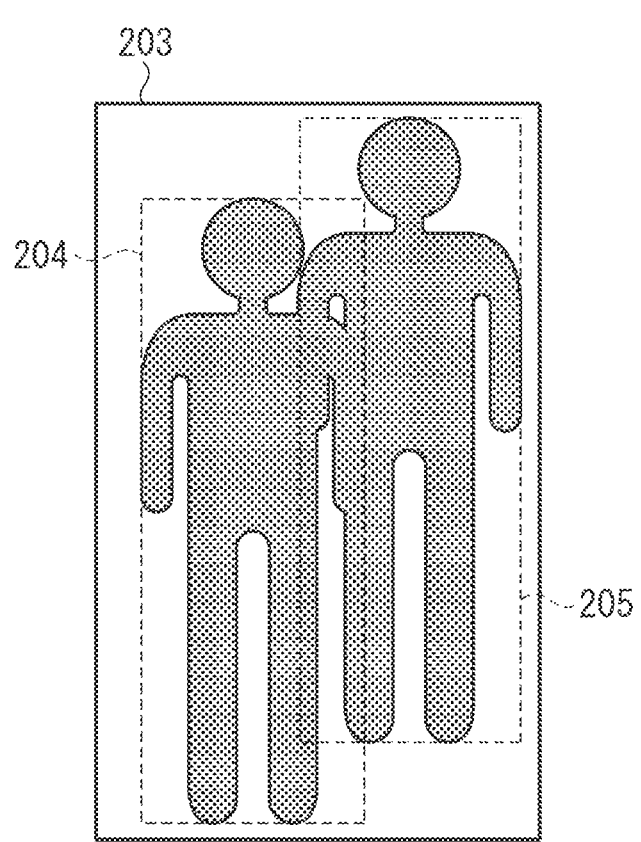
FIG. 2B illustrates an example of association between a detected object and a plurality of detected human bodies.

FIGS. 2A and 2B illustrate examples of the association between the detected object and the detected human body. FIG. 2A illustrates a case where a bounding box 201 of the detected object does not include a bounding box 202 of the detected human body. The bounding box 201 is a bounding box of the object detected by the object detection unit 102. The bounding box 202 of the human body is a bounding box of the human body detected by the human body detection unit 104. If an overlap ratio of the bounding box 202 of the human body to the bounding box 201 of the object exceeds a predetermined threshold, it is determined that the detected object and the detected human body are associated with each other. The overlap ratio is a ratio of an area of an overlapping part of the bounding box 201 of the object to the bounding box 202 of the human body to the area of the bounding box 202 of the human body.

The human body detection unit 104 extracts a feature amount of a part expected to be a human body in an image, and determines whether the part is a human body. If the human body detection unit 104 can adequately determine that the part is a human body from only the feature amount of the right side of the body, the human body detection unit 104 does not extract the shape of the left side of the body, determines the shape of the human body by estimation, and outputs the bounding box of the human body. By the operation, in the case where the feature amount as the human body can be adequately extracted in the bounding box of the moving body, and the feature amount of only the right side of the human body is included in the circumscribed rectangle of the moving body, the human body detection unit 104 estimates the shape of the left side of the human body and outputs the human body bounding box. Accordingly, in such a case, the left side of the human body is not included in the bounding box of the moving body.

FIG. 2B illustrates a case where a plurality of human bodies is detected from a bounding box 203 of a detected object. In this case, if the individual overlap ratios of a bounding box 204 of a human body and a bounding box 205 of a human body to the bounding box 203 of the object exceed a predetermined threshold respectively, it is determined that the detected object and the detected human bodies are associated with each other respectively. In such a case, the bounding boxes 204 and 205 of the human bodies are associated with the bounding box 203 of the object, and it is determined that the object of the bounding box 203 includes the two human bodies.

The trajectory management unit 106 manages movement information of an object tracked by the object tracking unit 103. Further, the trajectory management unit 106 manages information of a human body associated with the object by the object association unit 105 as an attribute of the object. In other words, the trajectory management unit 106 manages the association of the object being tracked with the human body (specific object) by the object association unit 105.

Figure 3:
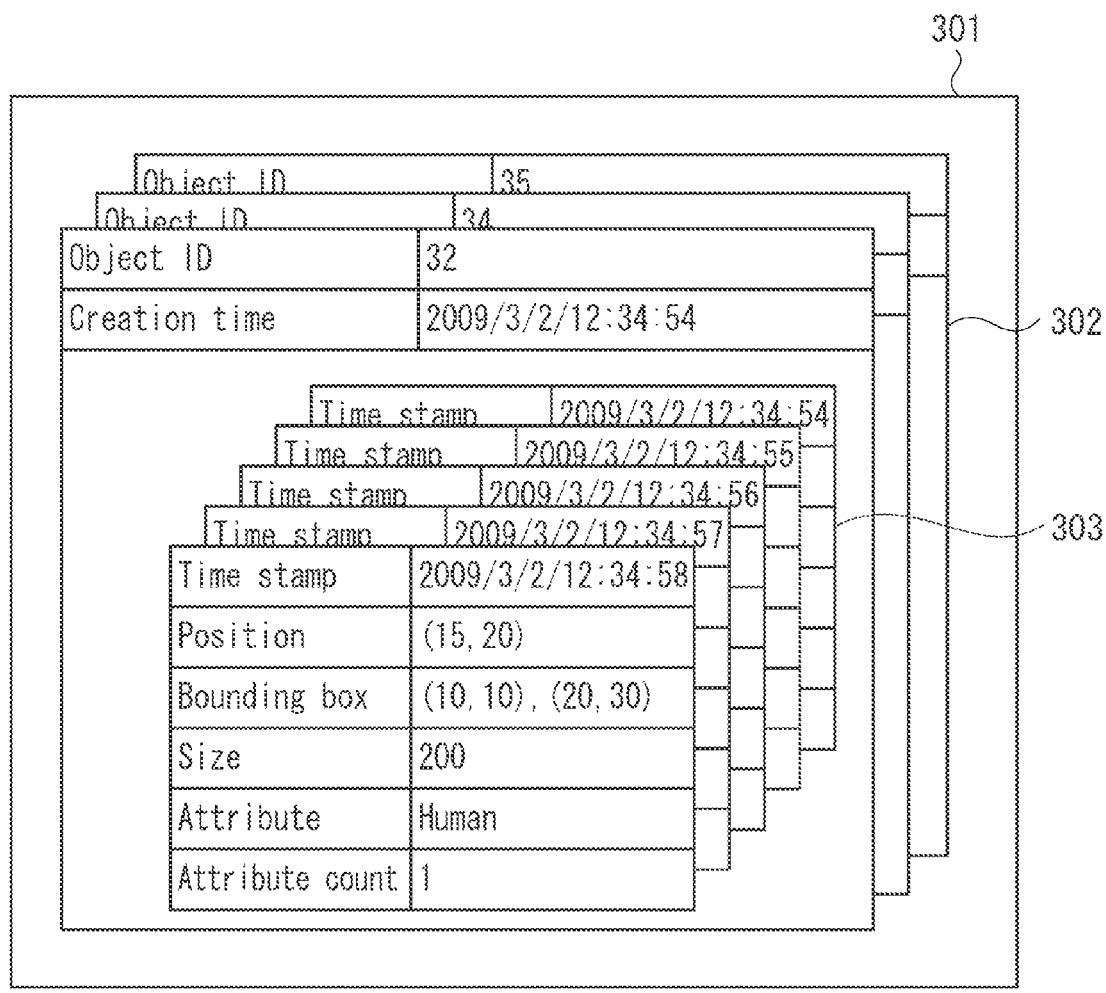
FIG. 3 illustrates an example of movement information management of an object.

FIG. 3 illustrates an example of the movement information management of an object by the trajectory management unit 106. Movement information (tracking information) 301 of the object is managed as object information 302 for each object ID. The object information 302 includes the time the object is detected first, and a group of position information 303 including the time the object is detected, the position on the screen, the bounding box, the size, the attribute of the object, and the attribute count. The attribute of the object is "no-attribute" or "human body". The attribute count is the number of human bodies associated with an object by the object association unit 105. In the example in FIG. 2B, the number of human bodies is "2". For example, in the object information 302 of an object ID "32", the time the object is detected first is 2009/3/2/12:34:54. When the object is detected at 2009/3/2/12:34:58, the center position of the bounding box is (15, 20), and the bounding box is expressed by (10, 10) and (20, 30). The size of the object is 200. The attribute is "human body", and the number of human bodies is "1".

By detecting a human body by the human body detection unit 104 and using a result of the object association unit 105, the corresponding attribute and the attribute count of the position information of the object are updated. Further, the attribute and the attribute count of the past position information is updated using the result. Further, to an attribute and the attribute count of future position information, the result is set.

In the above example, the position information includes the attribute and the attribute count, however, the information of the attribute or the attribute count can be directly associated with the object information 302. For example, at a time point the attribute of the object is detected to be "human body", the object ID of the object information 302 indicating the object can be associated with the attribute of "human body". By associating the object ID with the attribute of "human body", the current, past, and future position information included in the object ID and the attribute of "human body" can be associated with each other. In addition to the attribute, similarly, the attribute count can be directly associated with the object information 302.

When the human body detection unit 104 detects the object being tracked by the object tracking unit 103 to be the human body by the above-described processing, the trajectory management unit 106 can manage the trajectory of the object tracked at a past time point before the time point when the object being tracked is detected to be a human body as the trajectory of the human body.

The case where the human body detection unit 104 detects the object being tracked by the object tracking unit 103 to be the human body includes the case described with reference FIG. 2A in which the bounding box 201 of the detected object does not include the bounding box 202 of the detected human body. In other words, the object being tracked by the object tracking unit 103 is simply to be associated with the human body by the object association unit 105, and the object being tracked can be a part of the human body.

The case where the human body detection unit 104 detects the object being tracked by the object tracking unit 103 to be the human body also includes the case described with reference FIG. 2B in which the object of the bounding box 203 is associated with the human bodies of two people. In other words, the case where the object being tracked by the object tracking unit 103 is associated with the plurality of human bodies by the object association unit 105 is included.

Further, the case where the trajectory of the object being tracked is managed as the trajectory of the human body includes the case where only a part of the trajectory of the object being tracked is associated as the human body.

Figure 4:
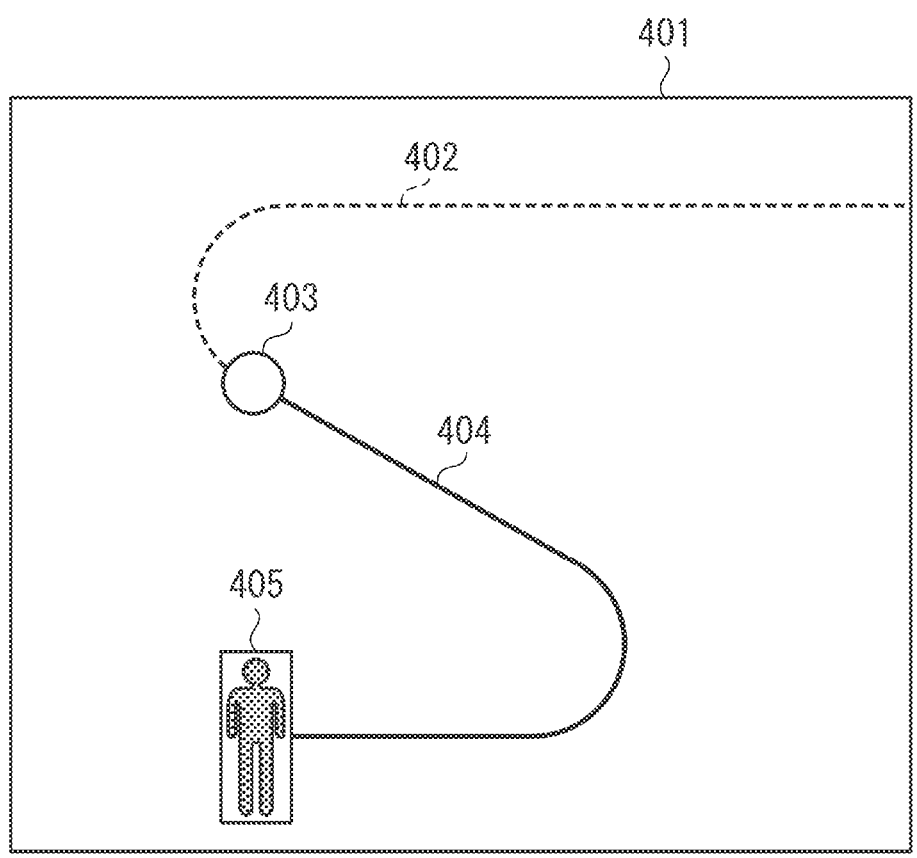
FIG. 4 illustrates an example of position information update.

FIG. 4 illustrates an example of the position information update. For example, at a point 403, if a human body is associated with an object, by setting an attribute and the attribute count associated at the point 403 to the following position information, a trajectory 404 is managed as the object having the human body attribute. Further by setting the attribute and the attribute count associated at the point 403 to past position information, a trajectory 402 can be managed as the object having the human body attribute. The trajectories 402, 404 and the point 403 correspond to the center positions of bounding boxes of the object detected at a predetermined time interval. When a human body is associated with the object at the point 403, the information of the attribute of "human body" is stored in the position information indicating the point 403. Further, the information of the attribute of "human body" is stored in the position information indicating the trajectory 402. In FIG. 4, reference numeral 401 denotes a screen, and reference numeral 405 denotes the object. As described above, in the case where the object detected by the object detection unit 102 and the human body detected by the human body detection unit 104 are associated with each other, the trajectory management unit 106 manages the information of the positions where the object existed by adding the attribute of "human body". In this example, the information of the positions before the object existed at the time points before the time point (the time point the object existed at the point 403) when the association of the object and the human body is performed is associated with the human body and managed. The past time points are time points the object moved on the trajectory 402.

As described above, in the exemplary embodiment, the attribute of the object is determined by the human body detection unit 104, however, it is not limited to the above-described case. As the attribute, any attributes such as a face, an automobile, and an animal that can be used for identifying and determining the object can be employed. Further, if a plurality of types of specific object detection units are provided and an object includes a plurality of attributes simultaneously, the object can have the plurality of types and the attribute count. In other words, as the attribute of the object of the position information 303, attributes of "human body", "automobile", "animal" and the like can be stored. Further, as the attribute count in the position information 303, the number of detected objects can be stored respectively for each of the attributes of "human body", "automobile" and "animal". For example, when one object detected by the object detection unit 102 includes two human bodies and one automobile, the information that the attributes of the object whose trajectory is managed are "human body" and "automobile", the number of the human bodies is two, and the number of the automobiles is one is managed.

The determination parameter setting unit 107 externally sets determination parameters for determining trajectory information of an object to the trajectory information determination unit 108. The determination parameters includes a pair of coordinates indicating a position for performing the determination, a region type for determining whether the pair of coordinates belongs to "region" or "line", a range of an object size, an object attribute, the attribute count, a range of the life time in the screen, and a detection event. FIG. 5 illustrates an example of the determination parameters. In the example, a passage of an object through the line connecting the coordinate (10, 10) and the coordinate (20, 30) is detected, in which, the object has a size from 100 to 250, an attribute of "human body", the number of attributes is one, and the life time is one second or more.

Figure 6:
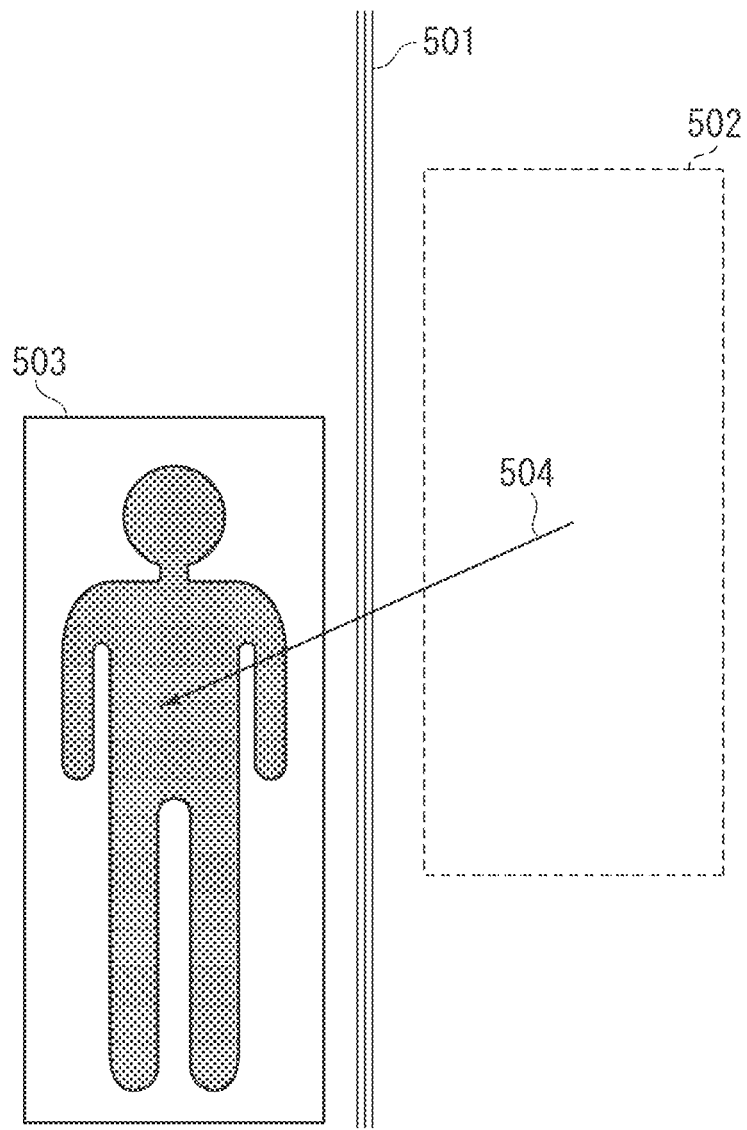
FIG. 6 illustrates an example of line segment passage determination.

FIG. 6 illustrates an example of the line passage determination. The determination of the passage is performed by determining whether a line segment 504 connecting the center point of a bounding box 502 of an object in a previous image and the center point of a bounding box 503 of the object in a current image intersects a determination line segment 501. The line segment 504 is a moving vector of the object. In the example, the passage is determined using the center points of the bounding boxes. Alternatively, the passage can be determined by detecting one of the bounding boxes passes the determination line segment 501. If the determination parameter is set to "region", whether the object enters the region or the object comes out of the region is determined. The specification for detecting whether the object enters the region or the object comes out of the region can be made by a detection event in the determination parameters.

The trajectory information determination unit 108 detects a target object by determining the trajectory information of the object managed by the trajectory management unit 106 using the determination parameters set in the determination parameter setting unit 107. The determination processing of the trajectory information is performed to all of the set determination parameters each time the trajectory information is updated in the trajectory management unit 106. For example, the trajectory information determination unit 108 determines a passage of an object being tracked across a specific place.

By the processing, in the case the determination is performed using the determination parameters illustrated in FIG. 5, the following determination can be performed. In other words, at a time point the object crosses the determination line segment 501, if the attribute of "human body" is not associated with the object, after the time point, at a time point the attribute of "human body" is associated with the object, the passage of the object to which the attribute of "human body" is associated through the line segment can be detected. The association of the attribute of "human body" is performed by the object association unit 105.

The external output unit 109 outputs the trajectory information of the object managed by the trajectory management unit 106 and the determination result of the trajectory information determination unit 108 to the outside.

Figure 7:
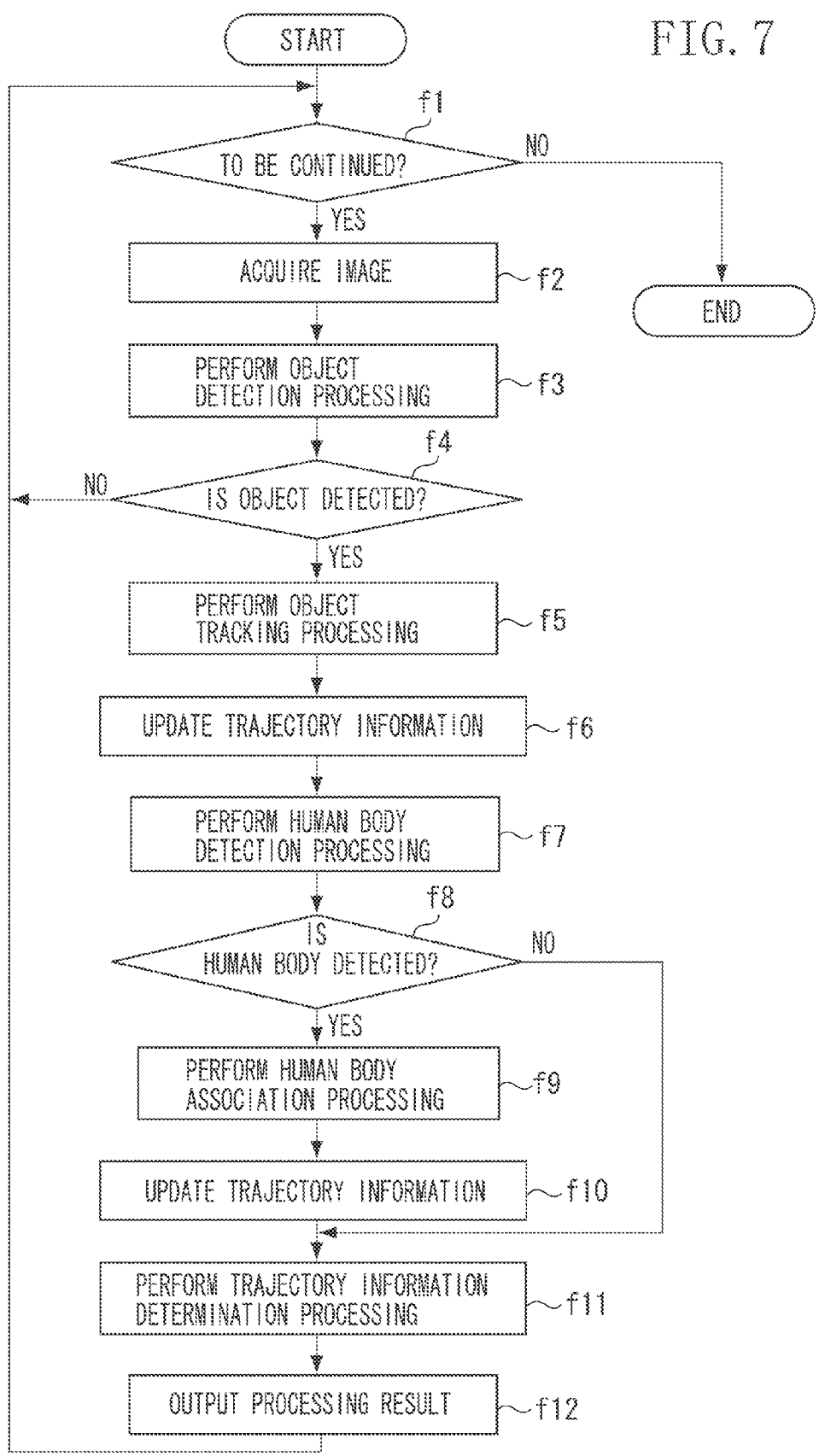
FIG. 7 is a processing flowchart.

FIG. 7 is a flowchart of the processing. In step f1, whether the processing is to be continued or finished is determined. When the processing is to be continued (YES in step f1), in step f2, the image acquisition unit 101 acquires an image from the outside. In step f3, the object detection unit 102 performs the object detection processing to the acquired image. In step f3, for example, the object detection unit 102 compares two images with each other, and determines that an object exists in different parts. In step f4, determination of the result in the object detection processing is performed. If an object is detected (YES in step f4), the processing proceeds to step f5, and if the object is not detected (NO in step f4), the processing returns to step f1.

If the object is detected (YES in step f4), in step f5, the object tracking unit 103 performs the tracking processing of the object. In step f6, using the tracking processing result, the trajectory management unit 106 updates the movement information (tracking information). In step f5, for example, in a case where the object detection unit 102 detects an object in a first image and detects an object in a second image, if the object tracking unit 103 determines that the distance between those two objects is closer than a predetermined distance, the object tracking unit 103 determines that those two objects are the same object. The trajectory management unit 106 manages the trajectory of the object being tracked by storing the individual positions of the object detected by the object detection unit 102 at each time point. The movement information managed by the trajectory management unit 106 is described above with reference to FIG. 3.

In step f7, the human body detection unit 104 performs the human body detection processing for detecting a human body from the region the object detection unit 102 detected the object. In step f8, the human body detection unit 104 determines the result. If a human body is detected (YES in step f8), the processing proceeds to step f9. If a human body is not detected (YES in step f8), the processing proceeds to step f11. The human body detection performed in step f8 is an example of the detection of a specific object. The specific object to be detected in step f8 is not limited to a human body. For example, an animal or an automobile can be detected.

If the human body is detected (YES in step f8), in step f9, the object association unit 105 performs the processing to associate the object with the human body. In step f10, using the result, the trajectory management unit 106 updates the movement information (tracking information). If the object detected by the object detection unit 102 overlaps with the human body detected by the human body detection unit 104 at a predetermined ratio or more, the object association unit 105 determines that the object detected by the object detection unit 102 is a human body, and adds an attribute of "human body" to the object detected by the object detection unit 102. Instead of the human body detection, if the object is determined to be an automobile or an animal, a corresponding attribute is added to the object detected by the object detection unit 102. The trajectory management unit 106 stores the information that the object being tracked by the object tracking unit 103 is determined to be the human body by the human body detection unit 104, and the attribute is associated with the object by the object association unit 105 as the movement information, and manages the trajectory and the attribute of the object. The attribute indicates that the object is a specific object.

As described above, if the object detected by the object detection unit 102 is associated with the human body detected by the human body detection unit 104, the trajectory management unit 106 manages the object as described below. In other words, the trajectory management unit 106 associates the information of the positions existed at time points before the time point (the time point corresponding to the point 403 in FIG. 4) when the object is associated with the human body with the human body and manages the information. The associated time points before the time point (the time point corresponding to the point 403 in FIG. 4) are time points corresponding to the trajectory 402 in FIG. 4. Accordingly, the trajectory of the movement of the specific object such as the human body can be accurately managed.

Further, in step f11, the trajectory information determination unit 108 performs the determination processing of the trajectory information. In step f12, the result of the determination and the trajectory information of the object managed by the trajectory management unit 106 is output to the outside. The trajectory information determination unit 108, for example, determines that the object being tracked passes through a specific place. The trajectory management unit 106 can include the function of the trajectory information determination unit 108, and perform the determination of the trajectory information.

As described above, according to the exemplary embodiment of the present invention, in the face of an object or an image which is hard to be detected as a feature of a human body, by performing the human body tracking and further updating the tracking information, accurate counting of the human body can be performed.

Other exemplary embodiments are described. In implementing the above-described exemplary embodiment, the trajectory of an object being tracked by the object tracking unit 103 can be displayed on a captured image. In such a case, if the trajectory management unit 106 associates the object being tracked with a specific object and manages the information, the display of the trajectory of the object can be displayed differently from the case where the association is not performed. For example, the color of the trajectory of the specific object can be different from colors of the trajectory of the other objects.

Further, if the association of the object being tracked with the specific object is performed in the object association unit 105, a trajectory of the object being tracked at a time point before the time point, when the association is performed, can be displayed as the trajectory of the specific object.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

In other words, a part or the whole of the image processing apparatus (tracking apparatus) 100 in FIG. 1 can be implemented by a computer. In the exemplary embodiment for implementing the whole of the image processing apparatus (tracking apparatus) 100 in FIG. 1 by the computer, the flowchart in FIG. 7 illustrates a flow of a program in the computer.

Both of the object detection processing in step f3 in FIG. 7 and the human body detection processing in step f7 or one of the processings can be implemented using hardware, and the other processings can be implemented by software processing by the computer. The exemplary embodiment is implemented by executing the following procedure with a computer-executable program. In other words, in the exemplary embodiment, the object determination procedure f4 for determining whether an object is detected from an image is performed, the tracking procedure f5 for tracking the detected object is performed, and further the trajectory management procedure f6 for managing the trajectory of the object being tracked is performed by updating the movement information (tracking information). The movement information is the information illustrated in FIG. 3. Further, the specific object determination procedure f8 for determining whether a specific object (human body) is detected from the image is performed. After the processing, the association procedure f9 for associating the object that is determined to be detected in the object determination procedure f4 with the specific object that is determined to be detected in the specific object determination procedure f8 is performed, and the movement information (trajectory information) is updated. By the updating processing, the specific object management procedure f10 for managing the association of the object being tracked with the specific object is performed.

In the specific object management procedure f10, the information of time points before the time point, when the association of the object with the specific object (human body) is performed, is associated with the specific object (human body), and managed. Further, in f11, the passage of the object being tracked across a specific place is determined.

The exemplary embodiments have been described in detail. The present invention can be applied to a system including a plurality of devices (for example, a host computer, an interface device, an imaging device, and web application), or an apparatus consists of a single device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-248977 filed Nov. 5, 2010, which is hereby incorporated by reference herein in its entirety.

What is claimed is:

1. An image processing apparatus comprising a processor executing a program recorded on a memory device, the executed program performing functions of:
   an object detection unit configured to detect an object area corresponding to an object from an image by using a first method;
   a tracking unit configured to track the detected object;
   a trajectory management unit configured to manage a trajectory of the object being tracked;
   a specific object detection unit configured to detect a specific object area corresponding to a specific object having a specific character or a specific pattern from the image by using a second method capable of detecting the specific object area without using a result of detection by the first method; and
   an object association unit configured to determine, based on a size of a crossover between the object area detected by the object detection unit by using the first method on the image and the specific object area detected by the specific object detection unit by using the second method on the image, whether to associate the object detected by the object detection unit and the specific object detected by the specific object detection unit,
   wherein the trajectory management unit stores data indicating that the object detected by the object detection unit and the specific object detected by the specific object detection unit are associated with each other by the object association unit.

2. The image processing apparatus according to claim 1, wherein, the trajectory management unit is configured to determine, after a first time when the object being tracked by the tracking unit is detected as the specific object having the specific character or the specific pattern, a trajectory of the object being tracked by the tracking unit before the first time as the trajectory of the specific object, wherein the object being tracked by the tracking unit has not been detected as the specific object before the first time, and to determine, in a case where the object being tracked by the tracking unit is detected as a plurality of specific objects by the specific object detection unit, that the object being tracked by the tracking unit before the first time includes the plurality of the specific objects.

3. The image processing apparatus according to claim 1, wherein, the trajectory management unit is configured to determine, after a first time when the object being tracked by the tracking unit is detected as the specific object having the specific character or the specific pattern, a trajectory of the object being tracked by the tracking unit before the first time as the trajectory of the specific object, wherein the object being tracked by the tracking unit has not been detected as the specific object before the first time, and to determine, in a case where the object being tracked by the tracking unit is determined as a plurality of types of specific objects by the specific object detection unit, that the object being tracked by the tracking unit before the first time includes the plurality of types of specific objects.

4. The image processing apparatus according to claim 1, wherein, the trajectory management unit is configured to store a position included in the trajectory in association with attribute information for identifying whether the position is a position of the specific object and determine, after a first time when the object being tracked by the tracking unit is detected as the specific object having the specific character or the specific pattern, a position where the object existed before the first time as a position of the specific object.

5. The image processing apparatus according to claim 1, wherein the trajectory management unit is configured to determine, after a first time when the object being tracked by the tracking unit is detected as the specific object having the specific character or the specific pattern, a trajectory of the object being tracked by the tracking unit before the first time as the trajectory of the specific object, wherein the object being tracked by the tracking unit has not been detected as the specific object before the first time, and to determine whether the object detected as the specific object passes through a specific place before the first time.

6. The image processing apparatus according to claim 1, wherein the trajectory management unit is configured to determine, in a case where an object being tracked by the tracking unit and not being associated with the specific object passes through a specific place and in a case where the object being tracked by the tracking unit is associated with the specific object after the object has passed through the specific place, that the specific object has passed through the specific place.

7. The image processing apparatus according to claim 1, wherein the first method is a background subtraction method.

8. The image processing apparatus according to claim 1, wherein the second method is a pattern matching method.

9. The image processing apparatus according to claim 1, wherein the specific object detection unit detects a human, an automobile or an animal.

10. The image processing apparatus according to claim 1, wherein the object detection unit is configured to detect a position of the object area; and wherein the specific object detection unit is configured to detect a position of the specific object area.

11. An image processing method comprising:
    detecting an object area corresponding to an object from an image by using a first method;
    tracking the detected object;
    managing a trajectory of the object being tracked;
    detecting a specific object area corresponding to a specific object having a specific character or a specific pattern from the image by using a second method capable of detecting the specific object area without using a result of detection by the first method;

determining, based on a size of a crossover between the object area detected on the image by using the first method and the specific object area detected on the image by using the second method, whether to associate the object detected and the specific object detected; and storing data indicating that the object detected and the specific object detected are associated with each other.

12. The image processing method according to claim 11, further comprising:

determining, after a first time when the object being tracked is detected as the specific object having the specific character or the specific pattern, a trajectory of the object being tracked before the first time as the trajectory of the specific object, wherein the object being tracked has not been detected as the specific object before the first time; and determining, in a case where the object being tracked is detected as the specific object detected, a position where the object existed before the first time, when the object is detected as the specific object existed before the first time.

13. The image processing method according to claim 11, further comprising:

determining, after a first time when the object being tracked is detected as the specific object having the specific character or the specific pattern, a trajectory of the object being tracked before the first time as the trajectory of the specific object, wherein the object being tracked has not been detected as the specific object before the first time; and determining whether the object detected as the specific object passes through a specific place before the first time.

14. The image processing method according to claim 11, wherein the first method is a background subtraction method.

15. The image processing method according to claim 11, wherein the second method is a pattern matching method.

16. The image processing method according to claim 11, wherein the specific object is a human, an automobile or an animal.

17. A computer-readable non-transitory storage medium storing a control program for causing a computer to perform operations, comprising:

determining whether an object area corresponding to an object is detected from an image by using a first method;

tracking the detected object;

managing a trajectory of the object being tracked;

determining whether a specific object area corresponding to a specific object having a specific character or a specific pattern is detected from the image by using a second method capable of detecting the specific object area without using a result of detection by the first method;

determining, based on a size of a crossover between the object area detected on the image by using the first method and the specific object area detected on the image by using the second method, whether to associate the object detected and the specific object detected; and storing data indicating that the object detected and the specific object detected are associated with each other.

18. The computer-readable storage medium storing the program according to claim 17, wherein the operations further comprises:

determining, after a first time when the object being tracked is detected as the specific object having the specific character or the specific pattern, a trajectory of the object being tracked before the first time as the trajectory of the specific object, wherein the object being tracked has not been detected as the specific object before the first time; and determining, in a case where the object being tracked is determined as the specific object, a position where the object existed before the first time, when the object is detected as the specific object existed before the first time.

19. The computer-readable storage medium storing the program according to claim 17, wherein the operations further comprises:

determining, after a first time when the object being tracked is detected as the specific object having the specific character or the specific pattern, a trajectory of the object being tracked before the first time as the trajectory of the specific object, wherein the object being tracked has not been detected as the specific object before the first time; and determining, in the managing the trajectory, whether the object detected as the specific object passes through a specific place before the first time.

20. The computer-readable storage medium according to claim 17, wherein the first method is a background subtraction method.

21. The computer-readable storage medium according to claim 17, wherein the second method is a pattern matching method.

22. The computer-readable storage medium according to claim 17, wherein the specific object is a human, an automobile or an animal.

* * * * *